United States Patent
Tiegs et al.

(10) Patent No.: US 6,579,393 B2
(45) Date of Patent: Jun. 17, 2003

(54) HIGH THERMAL CONDUCTIVITY LOSSY DIELECTRIC USING CO-DENSIFIED MULTILAYER CONFIGURATION

(75) Inventors: Terry N. Tiegs, Lenoir City, TN (US); James O. Kiggans, Jr., Oak Ridge, TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 122 days.

(21) Appl. No.: 09/837,891

(22) Filed: Apr. 18, 2001

(65) Prior Publication Data

US 2001/0015509 A1 Aug. 23, 2001

Related U.S. Application Data

(62) Division of application No. 09/398,347, filed on Sep. 17, 1999.
(51) Int. Cl.[7] .............................................. C04B 37/00
(52) U.S. Cl. .................. 156/89.11; 158/89.15
(58) Field of Search ...................... 156/89.11, 89.12, 156/89.15; 501/98.4, 92

(56) References Cited

U.S. PATENT DOCUMENTS

| 3,790,904 A | 2/1974 | Lesyk et al. ............. 333/22 R |
| 5,477,107 A | * 12/1995 | Tammaru et al. ............ 315/3.5 |
| 5,598,131 A | 1/1997 | Mazzochette ............. 333/22 R |
| 5,853,579 A | * 12/1998 | Rummler et al. ........... 210/170 |
| 6,118,358 A | * 9/2000 | Crouch ........................ 333/252 |

FOREIGN PATENT DOCUMENTS

| DE | 2 249 735 | 10/1972 |
| JP | 60-218739 | 11/1985 |
| RU | 1552-266 A | 3/1990 |

* cited by examiner

*Primary Examiner*—Michael W. Ball
*Assistant Examiner*—John T. Haran
(74) *Attorney, Agent, or Firm*—Gray Cary Ware & Freidenrich, LLP

(57) ABSTRACT

Systems and methods are described for loss dielectrics. A method of manufacturing a lossy dielectric includes providing at least one high dielectric loss layer and providing at least one high thermal conductivity-electrically insulating layer adjacent the at least one high dielectric loss layer and then densifying together. The systems and methods provide advantages because the lossy dielectrics are less costly and more environmentally friendly than the available alternatives.

17 Claims, 2 Drawing Sheets

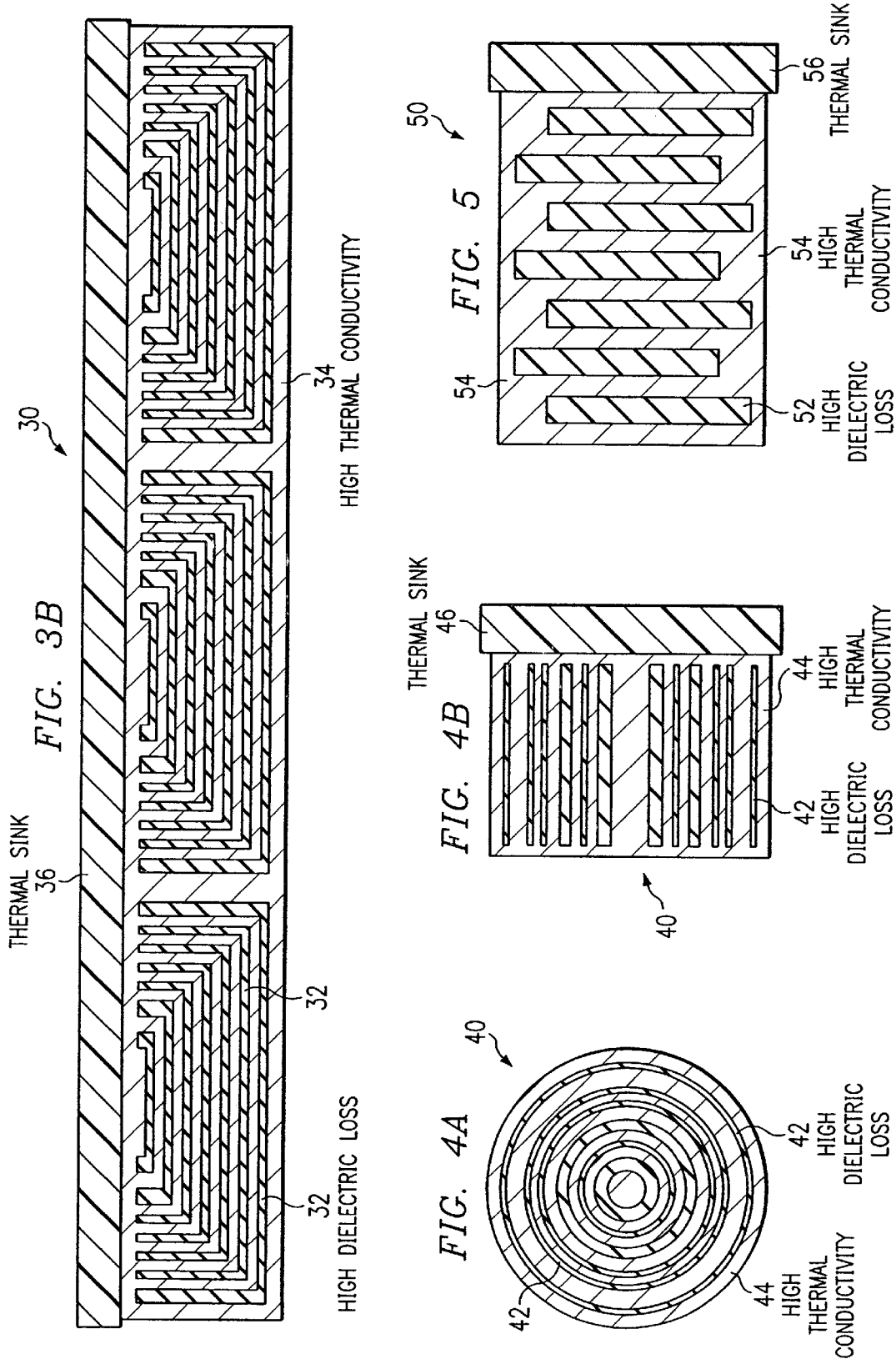

HIGH THERMAL CONDUCTIVITY LOSSY DIELECTRIC USING CO-DENSIFIED MULTILAYER CONFIGURATION

CROSS-REFERENCE TO RELATED APPLICATION

This application is a divisional of and claims a benefit of priority under 35 U.S.C. 120 from utility patent application U.S. Ser. No. 09/398,347, filed Sep. 17, 1999.

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corporation, and the Government has certain rights in this invention.

BACKGROUND OF THE INVENTION

1. Field of the Invention

The invention relates generally to the field of dielectrics. More particularly, the invention relates to lossy dielectrics.

2. Discussion of the Related Art

Nearly all high power microwave sources used for radar and communications rely on vacuum electron devices ("tubes") to create or amplify the microwave signal. A wide variety of these devices exists; oscillator tubes such as magnetrons and gyrotrons operate at a more or less fixed frequency, whereas amplifier tubes such as klystrons and traveling wave tubes (TWTs) may amplify signals over some frequency range. TWTs can be configured in a number of different design variants such as ring-loop, ring-bar, coupled-cavity, and helix TWTs. Those familiar with the design of microwave amplifier tubes have long appreciated that it is necessary to suppress various undesirable microwave signals that may arise during operation, because if these undesirable signals are not suppressed the tube may begin to oscillate or suffer other performance degradation. Such undesirable signals may include feedback (a reflected signal propagating back toward the low-power circuit), harmonics of the desired signal, noise, etc.

To suppress the aforementioned undesirable signals, microwave amplifier tubes such as klystrons and TWTs generally incorporate loads of one form or another. The load is made of a material having a high dielectric loss, and its size, shape, and location within the tube are chosen to best attenuate undesirable signals while not attenuating desired signals. One tube may contain a number of these loads in the form of small cylinders, rings, wedges, etc. affixed to the tube structure at selected locations.

It will be appreciated that the load attenuates microwave power by converting it to heat, which must in turn be removed by conduction through the metal vacuum envelope of the tube. For this reason, loads have generally been made of BeO or AlN with a dispersed phase of SiC, in which the high loss tangent of the SiC converts the microwave power to heat and the excellent thermal conductivity of the BeO or AlN allows this heat to be conducted to the tube wall which is, in turn, typically air- or liquid-cooled copper. Conventional load materials typically contain about 40% SiC dispersed uniformly throughout a BeO matrix. As discussed later, this uniform dispersion of power within a second phase leads to less than desirable thermal performance.

Increasingly, there are economic and regulatory pressures to eliminate the use of BeO because of its toxicity. What is needed, therefore, is a less toxic approach to providing lossy dielectrics.

One approach was to use a composite of AlN with a uniform dispersion of SiC particles (about 40 vol. % SiC). The composites exhibited good dielectric properties, but the thermal conductivity was too low (less than 50 W/m° K) to withstand high heat loads encountered in broad microwave applications.

In ceramics, heat conduction is dominated at moderate temperatures (less than about 600° C.) by phonons (lattice vibrations). High conductivities are achieved in the least cluttered structures. In other words simple crystal structures with few kinds of elements, where the constituent atoms are similar in atomic weight, and the atomic bonding is high. AlN and SiC meet these conditions as single crystals and intrinsically possess high thermal conductivities. In polycrystalline materials, the thermal conductivity is directly proportional to the amount of scattering of the phonons (sometimes referred to as the mean free path) by defects. Defects are associated with secondary atoms in the crystal lattice, pores, grain boundaries and second phase particles. In a two-phase composite of AlN and SiC, scattering of phonons can occur at the interfaces between the two phases even though each phase exhibits high thermal conductivity at a single phase. In addition, because of differences in thermal expansion coefficients, microcracks or other incontinuities can develop between phases which would further decrease the thermal conductivity.

Thus, in a AlN-SiC composite with uniformly distributed phases as practiced in the prior art, phonon scattering occurs at the interfaces to significantly decrease the overall thermal conductivity. The layered composite structures described in the present patent are distinguished from the prior art by the presence of continuous high thermal conductivity paths between layers of high dielectric loss. The high thermal conductivity paths will dominate the overall thermal conductivity of the composite and result in a composite of high thermal conductivity.

Another disadvantage of the BeO—SiC approach has been relatively high cost. Therefore, what is also needed is a solution that meets the above-discussed requirements in a more cost effective manner.

Heretofore, the requirements of environmental friendliness and economy referred to above have not been fully met. What is needed is a solution that simultaneously addresses both of these requirements. The invention is directed to meeting these requirements, among others.

SUMMARY OF THE INVENTION

A goal of the invention is to simultaneously satisfy the above-discussed requirements of environmental friendliness and economy which, in the case of the prior art, are mutually contradicting and are not simultaneously satisfied.

One embodiment of the invention is based on a multilayered configuration of high dielectric loss and high thermal conductivity-electrically insulating materials that is used to form a lossy dielectric. Another embodiment of the invention is based on a method wherein a continuous high thermal conductivity-electrically insulating material (e.g. aluminum nitride, magnesium oxide or silicon nitride) and a high dielectric loss (e.g. ceramic, metal, etc.) material are laminated to form a lossy dielectric.

The lossy dielectric can be a laminated composite that is optimally bonded to a thermal sink. The bonding can be effected by typical methods, such as brazing, soldering or mechanical shrink fitting. The laminated composite with the high thermal conductivity material on the exterior surfaces is preferably not electrically conductive.

These, and other, goals and embodiments of the invention will be better appreciated and understood when considered in conjunction with the following description, examples and the accompanying drawings and the examples. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

Laminated multilayer composite structures are well known in the prior art for use as electronic devices for applications such as integrated circuit (IC) devices. For IC devices, the materials are typically $Al_2O_3$ or AlN and a conductor, such as Mo or W. In these prior applications, the devices are electrical conductors. Devices that embody the invention are not electrical conductors due to the fact that the high thermal conductivity material, which is continuous and on the exterior surfaces, is an electrical insulator.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawing accompanying and forming a part of this specification. It should be noted that the features illustrated in the drawing are not necessarily drawn to scale.

FIG. 3B illustrates a schematic side view of the multilayered dielectric shown in FIG. 3A.

FIG. 4A illustrates a schematic axial view of a multilayered dielectric, representing an embodiment of the invention.

FIG. 4B illustrates a schematic transverse view of the multilayered dielectric shown in FIG. 4A.

FIG. 5 illustrates a schematic side view of a multilayered dielectric, representing another embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes medium-to-high vacuum electron devices 5. Examples for such devices include microwave amplifiers (e.g. traveling wave tubes and Klystrons). The invention can also utilize data processing methods that transform signals from circuits that include the lossy dielectric so as to actuate interconnected discrete hardware elements; for example, to activate piezoelectric elements to change the shape of the lossy dielectric structure in response to an external event, thereby creating a smart lossy dielectric.

Figure 1:
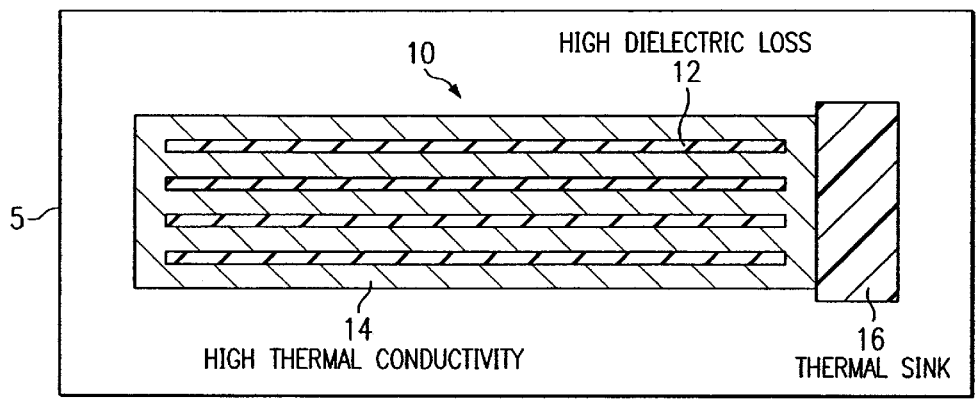
FIG. 1 illustrates a schematic side view of a multilayer dielectric, representing an embodiment of the invention.

FIG. 1 illustrates a lossy dielectric 10 according to the invention. The lossy dielectric can include two high thermal conductivity electrically insulating layers 14 sandwiching a high dielectric loss layer 12 or two high dielectric loss layers 12 sandwiching a high thermal conductivity electrically insulating layer 14. The lossy dielectric 10 can include a plurality of high dielectric loss layers 12 and a plurality of high thermal conductivity electrically insulating layers 14 which alternate with one another. As depicted in FIG. 1, the lossy dielectric 10 includes four substantially parallel high dielectric loss layers 12 surrounded by five high thermal conductivity-electrically insulating layers 14. The five high thermal conductivity electrically insulating, layers 14 are joined together at their edges, thereby forming a continuous high thermal conductivity-electrically insulating phase. In any event, the lossy dielectric 10 includes at least one high thermal conductivity electrically insulating layer 14 adjacent to at least one high dielectric loss layer 12.

A thermal sink 16 can be coupled to the at least one high thermal conductivity electrically insulating layer 14. Such a thermal sink 16 may allow the lossy dielectric to operate at a higher power level, a higher loss ratio, and/or without thermal damage to the lossy dielectric layer or the other structural components near the lossy dielectric.

A high thermal conductivity-electrically insulating layer 14 for use in the lossy dielectrics 10 according to the present invention preferably has a thermal conductivity of at least approximately 70 W/m° K, more preferably at least approximately 100 W/m° K and most preferably at least approximately 120 W/m°K. Further, the high thermal conductivity electrically insulating layer 14 preferably has a thermal conductivity of approximately 70–400 W/m° K and more preferably approximately 100–200 W/m° K.

Suitable materials for providing the high thermal conductivity-electrically insulating properties of the layer include, but are not limited to, aluminum nitride, magnesium oxide and gas-pressure-sintered $Si_3N_4$ with elongated grains. A high thermal conductivity electrically insulating layer 14 including these materials can be fabricated by methods such as tape casting, roll compaction, extrusion and slip casting.

A high dielectric loss layer 12 for use in the lossy dielectrics 10 according to the present invention preferably have a dielectric loss (tangent delta) of at least about 0.0 1, more preferably at least about 0.06 and most preferably at least about 0.20. Suitable materials for the high dielectric loss layer 12 include, but are not limited to (a) ceramic particles, (b) metal or intermetallic particles, or (c) composites of two or more of metal, intermetallic, and ceramic materials. Possible ceramic particles include SiC, TiC, $TiB_2$, TiN, WC, TaC, HfC, $WB_6$, C, $B_4C$, $Mo_2C$, ZrN, $Cr_3C_2$, and combinations of these. Other ceramic materials are also possible. Possible metal particles include Mo, W, Ni, Pd, Pt, Ag, NiAl, NiSi, $MoSi_2$, and combinations of these. Other metallic materials are also possible. The high dielectric loss layer 12 can also be a composite. For example, the high dielectric loss layer 12 could be SiC-glass or $MoSi_2$—$Si_3N_4$ composite.

The high dielectric loss layer 12 can be fabricated by either tape casting or screen printing methods. Because the lossy dielectrics 10 according to the invention can have multiple layers, the high dielectric loss layer 12 can be fabricated in selected patterns depending on the requirements. For instance, a pattern that fits the available footprint space in a miniaturized package, or the shape that provides a desired electronic function (e.g. circuit response). It may also be possible to fabricate the high dielectric loss layer 12 with a variable thickness by appropriate screen printing techniques.

The materials in the high dielectric loss layer 12 and the high thermal conductivity-electrically insulating layer 14 are selected to minimize thermal expansion differences between the layers and/or to facilitate densification compatibilities between layers. Layered lossy dielectrics 10 according to the present invention can be fabricated by laminating the layers together and then densifying. The densification would be initially by hot-pressing, but sintering without pressure assistance may be possible depending on the densification kinetics of the layers.

The densification can be followed by a heat-treatment step. A suitable heat treatment step may include annealing at 200–2000° C. for 1 to 60 minutes. When the high thermal conductivity electrically insulating layer 14 includes $Si_3N_4$, the heat treatment step can serve to develop the elongated grain microstructure.

The phrase "lossy dielectric", is used herein, as defined as a structural component that exhibits a loss of energy in the form of heat generated by a variable (e.g., oscillatory) electric field. A lossy dielectric converts at least approximately 5% of the applied electrical power to thermal energy, preferably at least 10%, more preferably at least approximately 20%. The term "approximately", as used herein, is defined as at least close to a given value (e.g., preferably within 10% of, more preferably within 1% of, and most preferably within 0.1% of). The term "substantially", as used herein, is defined as at least approaching a given state (e.g., preferably within 10% of, more preferably within 1% of, and most preferably within 0.1% of). The term "coupled", as used herein, is defined as connected, although not necessarily directly, and not necessarily mechanically.

The disclosed embodiments show a planar configuration as the structure for providing the function of a lossy dielectric 10, but the structure for providing a lossy dielectric 10 can be any other structure capable of performing the function of a lossy dielectric 10, including, by way of example a series of substantially concentric cylinders, a series of substantially concentric (hemi)spheres or any other layered configuration so long as the layered structure is oriented to provide at least one high thermal conductivity path between the high dielectric loss material and the cooling surface or heat sink.

Figure 2:
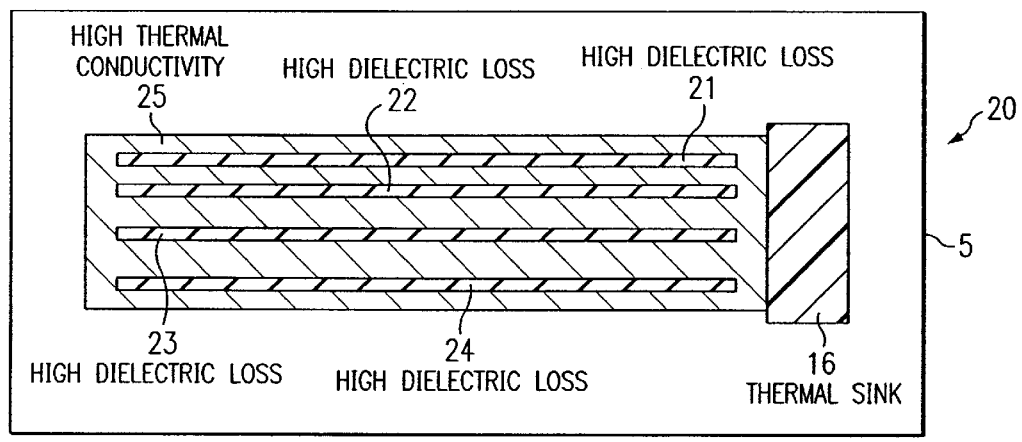
FIG. 2 illustrates a schematic side view of a multilayer dielectric, representing another embodiment of the invention.

The thicknesses of both the high thermal conductivity layer 14 and high dielectric loss layer 12 can be varied depending on the power requirements and frequency of the application. The layers can be matched to give a desired fraction of the wavelength. It will be appreciated that the amount of lossy material may be varied or graded from one layer to another as shown in FIG. 2 in order to minimize the reflection of microwave power from the lossy dielectric. This variation can be achieved by varying the relative thicknesses of the lossy and high thermal conductivity layers, by varying the amount or pattern of lossy material printed on the high thermal conductivity layers.

Referring to FIG. 2, a gradient lossy dielectric 20 includes a first high dielectric loss layer 21, a second high dielectric loss layer 22, a third high dielectric loss layer 23, and a fourth high dielectric loss layer 24. The high dielectric loss layers are separated and surrounded by a high thermal conductivity material 25. The high thermal conductivity material 25 is joined to a thermal sink 28.

It can be appreciated that there is less distance between the first high dielectric loss layer 21 and the second high dielectric loss layer 22 than between the second high dielectric loss layer 22 and the third high dielectric loss layer 23. Similarly, there is less distance between the second high dielectric loss layer 22 and the third high dielectric loss layer 23 than between the third dielectric loss layer 23 and the fourth high dielectric loss layer 24.

Figure 3A:
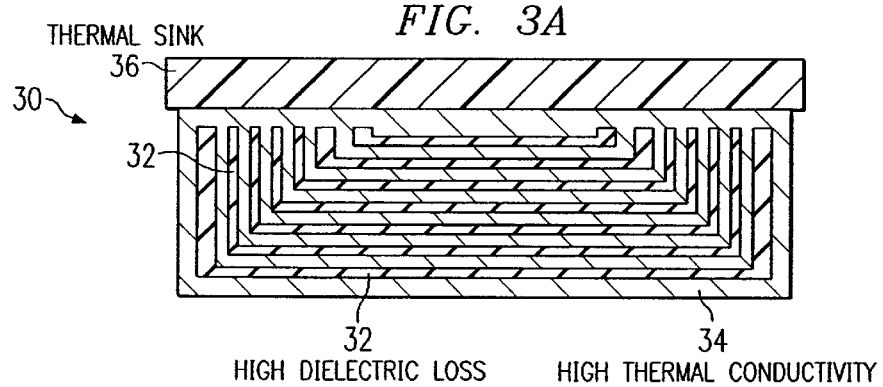
FIG. 3A illustrates a schematic end view of a multilayered dielectric, representing another embodiment of the invention.

Referring to FIGS. 3A and 3B, two views of a lossy dielectric 30 are shown. The lossy dielectric 30 includes a high dielectric loss phase 32 and a high thermal conductivity electrically insulating phase 34. The high thermal conductivity electrically insulating phase 34 is coupled to a thermal sink 36.

Referring to FIGS. 4A and 4B, two views of a cylindrically symmetric lossy dielectric 40 are shown. The cylindrically symmetric loss dielectric 40 includes a high dielectric loss phase 42 and a high thermal conductivity electrically insulating phase 44. The high thermal conductivity electrically insulating phase 44 is coupled to a thermal sink 46.

Further referring to FIG. 5, a staggered lossy dielectric 50 is depicted. The staggered lossy dielectric 50 includes a high dielectric loss phase 52 and a high thermal conductivity electrically insulating phase 54. The high thermal conductivity electrically insulating phase 54 is coupled to a thermal sink 56.

The high dielectric loss phase 52 is composed of seven high dielectric loss layers. The high dielectric loss layers in the depicted embodiment are substantially parallel and staggered with regard to their peripheral extent.

While not being limited to any particular performance indicator or diagnostic identifier, preferred embodiments of the invention can be identified one at a time by testing for the presence of a predictable and narrow standard distribution of dielectric loss. The test for the presence of a predictable and narrow standard distribution of dielectric loss can be carried out without undue experimentation by the use of a simple and conventional bench-top dielectric loss experiment.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of he invention.

Example 1

Two tape cast slurries were made from the following list of materials by typical powder processing methods:

AlN—$Y_2O_3$ Tape (High thermal conductivity-Electrical Insulating)

toluene1±ethanol2 mixture (5:1 by wt.) 23.5 g

Hypermer KD-1 dispersant3 0.5 g

-Butyl Phalate4 5.75 g

Elvacite 20105 (methyl methacrylate) 5.5 g aluminum nitride powder (grade D)6 87.65 g yttrium oxide (5600)7 7.62 g AlN—SiC—$Y_2O_3$ Tape (High dielectric loss)

toluene1±ethanol2 mixture (5:1 by wt.) 25.9 g

Hypermer KD-1 dispersant3 0.5 g

-Butyl Phalate4 6.25 g

Elvacite 20105 6.25 g aluminum nitride powder (grade D)6 45.5 g yittrium oxide (5600)7 3.8 g silicon carbide (grade A-10)8 46.74 g A standard tape casting process was then performed with each of the two slurries to fabricate tapes approximately 0.007 in. thick. The tapes were dried and discs approximately 1.4 in. diameter were punched out. Note that 13 each of AlN—$Y_2O_3$ and 12 each of AlN—SiC—$Y_2O_3$ discs were stacked on top of each of other, starting and finishing with the AlN—$Y_2O_3$ discs. The tape stack with mylar disc ends was placed in a die and pressed at 35 MPa for 5 min. The laminated disc was heated in a tube furnace in a flowing nitrogen atmosphere to remove the binder. The binder removal run was at a rate of approximately 1° C./ min. to a final temperature of 500° C., with 1 h (one hour) holds during the heat-up at 200, 250, 300, 350, 400, and 500° C.

The laminated stack was loaded into a graphite (BN coated) hot-press die. The laminate was heated to 1750° C. in 1 h (one hour) under nitrogen, the sample pressed to 25 MPa and held at this temperature and pressure for 1 h (one hour) and then cooled at 30° C./ min. to room temperature.

The faces of the densified sample were then ground flat The edges of the disc were ground to remove any excess material. The density of the sample was measured using the Archimedes immersion density method in absolute alcohol. The bulk density was 3.24, which is approximately 98.8% of the theoretical density . The thermal diffusivity of the disc was measured using a xenon laser flash system. The thermal conductivity was determined to be 120 watts/ m° K.

Example 2

For comparison of properties a hot pressed laminated disc of the AlN—$Y_2O_3$ tape Composition was prepared. The procedures were the same as the above example, except only the AlN—$Y_2O_3$ punched discs were stacked and hot pressed using the same conditions as example 1.

The hot pressed AlN—$Y_2O_3$ tape laminate had a density of 3.30 g/cm3 which is approximately 97.5% of theoretical density. The thermal conductivity was determined to be 170 watts/m° K.

Example 3

The third comparative example was for a hot pressed AlN—SiC—$Y_2O_3$ sample that was prepared from mixed starting powders. The following powders were mixed in a similar fashion to those in the previous examples:

aluminum nitride powder (grade D)6 70.47 g silicon carbide (grade A-10)8 23.40 g yittrium oxide (5600)7 6.13 g A 25 g of the powder was hot pressed using the identical conditions as examples 1 and 2. The hot pressed pellet had a density of 3.27 g/cm3 which is approximately 99.8% of theoretical density. The thermal conductivity was determined to be 65 watts/m° K.

There are virtually innumerable uses for lossy dielectrics 10 according to the invention. For instance, lossy dielectrics 10 according to the invention can be used in medium to high power vacuum electron devices.

A lossy dielectric 10, representing an embodiment of the invention, can be cost effective and advantageous for at least the following reasons. The invention is more economical than BeO based lossy dielectrics. The invention is less toxic than BeO based lossy dielectrics. The development of a replacement to BeO—SiC composites would have a significant impact on many medium-to-high power vacuum electron devices. These materials should be vacuum compatible, have high thermal conductivity in at least one direction to accommodate high thermal flux, have tailored electromagnetic losses and have high dielectric loss.

In the preferred embodiments, the layers comprise generally thin laminate, i.e., heat flowing out of the high dielectric loss layer has a relatively short path out of this layer and a relatively longer path through (or along) the high thermal conductivity layer to the cooling surface. Those skilled in the art will appreciate that this combination is partly responsible for the excellent thermal properties of the inventive material. In many of the exemplary illustrations and examples, the high thermal conductivity layers are oriented generally perpendicular to the cooling surface or thermal sink. It will be appreciated, however, that in the construction of some loads (for example, thin wedges) it might be more convenient to orient the individual laminae at an oblique angle to the cooling surface while still preserving the essential features of the invention as claimed.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the lossy dielectrics 10 described herein can be a physically separate module, it will be manifest that the lossy dielectrics 10 are integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A method of manufacturing a lossy dielectric, comprising:

providing a material for at least one high dielectric loss layer;

providing a material for at least one high thermal conductivity electrically insulating layer adjacent the material for the at least one high dielectric loss layer; and then densifying the material for the at least one high dielectric loss layer and the material for the at least one high thermal conductivity electrically insulating layer together, said at least one high thermal conductivity layer providing at least one substantially continuous thermal path to at least one surface of said lossy dielectric whereby heat may be removed from said lossy dielectric by conduction.

2. The method of claim 1, wherein providing the material for the at least one high dielectric loss layer includes tape casting the at least one high dielectric loss layer.

3. The method of claim 1, wherein providing the material for the at least one high dielectric loss layer includes screen printing the at least one high dielectric loss layer.

4. The method of claim 1, wherein providing the material for the at least one high thermal conductivity electrically insulating layer includes at least one technique selected from the group consisting of tape casting, roll compaction, extrusion and slip casting.

5. The method of claim 1, wherein providing the material for the at least one high thermal conductivity electrically insulating layer adjacent the material for the at least one high dielectric loss layer includes
laminating the material for the at least one high dielectric loss layer to the material for the at least one high thermal conductivity electrically insulating layer.

6. The method of claim 1, further comprising:
heat treating the at least one high dielectric loss layer and the at least one high thermal conductivity electrically insulating layer after densifying.

7. The method of claim 6, wherein heat treating includes annealing.

8. A lossy dielectric made by the method of claim 1.

9. The method of claim 1, wherein the densifying results in a gradient lossy dielectric.

10. The method of claim 1, wherein:
densifying includes hot pressing the at least one high dielectric loss layer and the at least one high thermal conductivity electrically insulating layer.

11. The method of claim 1, wherein:
densifying includes sintering the at least one high dielectric loss layer and the at least one high thermal conductivity electrically insulating layer.

12. The method of claim 1, further comprising coupling the lossy dielectric to a thermal sink.

13. A method of manufacturing a lossy dielectric, comprising:
providing a material for at least one high dielectric loss layer;
providing a material for at least one high thermal conductivity electrically insulating layer adjacent the material for the at least one high dielectric loss layer; and then
densifying the at least one high dielectric loss layer and the at least one high thermal conductivity electrically insulating layer.

14. The method of claim 13, wherein:
densifying includes hot pressing the at least one high dielectric loss layer and the at least one high thermal conductivity electrically insulating layer.

15. The method of claim 13, wherein:
densifying includes sintering the at least one high dielectric loss layer and the at least one high thermal conductivity electrically insulating layer.

16. The method of claim 13, wherein the material for the at least one high thermal conductivity electrically insulating layer and the material for the at least one high thermal conductivity electrically insulating layer are laminated together before densifying.

17. The method of claim 13, further comprising coupling the lossy dielectric to a thermal sink.

* * * * *